United States Patent
Deng et al.

(10) Patent No.: US 12,317,135 B2
(45) Date of Patent: May 27, 2025

(54) METHODS AND APPARATUSES FOR COMMUNICATION BETWEEN RADIO EQUIPMENT AND RADIO EQUIPMENT CONTROLLER

(71) Applicant: Telefonaktiebolaget LM Ericsson (publ), Stockholm (SE)

(72) Inventors: Jun Deng, Beijing (CN); Shujie Yang, Beijing (CN); Zhenning Zhao, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 629 days.

(21) Appl. No.: 17/627,849

(22) PCT Filed: Jul. 19, 2019

(86) PCT No.: PCT/CN2019/096876
§ 371 (c)(1),
(2) Date: Jan. 18, 2022

(87) PCT Pub. No.: WO2021/012113
PCT Pub. Date: Jan. 28, 2021

(65) Prior Publication Data
US 2022/0264372 A1 Aug. 18, 2022

(51) Int. Cl.
*H04W 8/22* (2009.01)
*H04W 24/08* (2009.01)
(Continued)

(52) U.S. Cl.
CPC ............ *H04W 28/22* (2013.01); *H04W 24/08* (2013.01); *H04W 28/0257* (2013.01); *H04W 88/12* (2013.01)

(58) Field of Classification Search
CPC ..... H04W 28/22; H04W 28/02; H04W 24/08; H04W 28/06; H04W 88/12; H04W 28/08;
(Continued)

(56) References Cited

U.S. PATENT DOCUMENTS

| | | | |
|---|---|---|---|
| 7,680,149 B2 * | 3/2010 | Liu | H04J 3/1617 370/467 |
| 11,696,242 B2 * | 7/2023 | Anand | H04J 3/0635 370/350 |

(Continued)

FOREIGN PATENT DOCUMENTS

| | | |
|---|---|---|
| CN | 102131248 A | 7/2011 |
| CN | 102340352 A | 2/2012 |

(Continued)

OTHER PUBLICATIONS

Extended European Search Report for European Patent Application No. 19938151.8, mailed Feb. 28, 2023, 7 pages.
(Continued)

*Primary Examiner* — Man U Phan
(74) *Attorney, Agent, or Firm* — Withrow & Terranova, PLLC

(57) ABSTRACT

Methods and apparatuses for communication between a radio equipment and a radio equipment controller are disclosed. According to an embodiment, a first transport equipment detects a bit rate of one of a radio equipment and a radio equipment controller. The one of the radio equipment and the radio equipment controller is connected with the first transport equipment through a first common public radio interface (CPRI) link. The first transport equipment locks a working bit rate of a first CPRI port of the first transport equipment to the detected bit rate. The first transport equipment generates a message indicating the detected bit rate and sends the message to a second transport equipment that is (Continued)

connected with the other of the radio equipment and the radio equipment controller through a second CPRI link.

13 Claims, 5 Drawing Sheets

(51) Int. Cl.
*H04W 28/02* (2009.01)
*H04W 28/22* (2009.01)
*H04W 88/12* (2009.01)

(58) Field of Classification Search
CPC ..... H04W 28/18; H04W 28/24; H04W 24/04; H04W 56/00; H04W 76/10; H04W 84/20; H04L 1/20; H04L 1/00; H04L 12/18; H04L 25/14
USPC ......................................................... 370/229
See application file for complete search history.

(56) References Cited

U.S. PATENT DOCUMENTS

| 2011/0032910 | A1* | 2/2011 | Aarflot | H04J 3/0682 370/335 |
| 2012/0057572 | A1* | 3/2012 | Evans | H04L 45/74 370/338 |
| 2014/0094157 | A1* | 4/2014 | Nguyen | H04W 12/37 455/418 |
| 2016/0127250 | A1* | 5/2016 | McCormick | H04L 43/0852 370/235 |
| 2016/0277964 | A1* | 9/2016 | Xu | H04W 88/085 |
| 2021/0185539 | A1* | 6/2021 | Quinquis | H04W 76/10 |
| 2022/0377692 | A1* | 11/2022 | Anand | H04W 56/001 |

FOREIGN PATENT DOCUMENTS

| EP | 4040915 A1 | 8/2022 |
| WO | 2018103083 A1 | 6/2018 |

OTHER PUBLICATIONS

Author Unknown, "IEEE Standard for Radio over Ethernet Encapsulations and Mappings," IEEE Standard 1914.3, 2018, 77 pages.
Author Unknown, "NGMN Overview on 5G RAN Functional Decomposition," NGMN: The Engine of Broadband Wireless Innovation, Version 1.0, Feb. 2018, 48 pages.
Ericsson AB, et al., "Common Public Radio Interface (CPRI); Interface Specification," CPRI Specification, Version 7.0, Oct. 2015, 128 pages.
International Search Report and Written Opinion for International Patent Application No. PCT/CN2019/096876, mailed Apr. 15, 2020, 10 pages.

* cited by examiner

METHODS AND APPARATUSES FOR COMMUNICATION BETWEEN RADIO EQUIPMENT AND RADIO EQUIPMENT CONTROLLER

This application is a 35 U.S.C. § 371 national phase filing of International Application No. PCT/CN2019/096876, filed Jul. 19, 2019, the disclosure of which is incorporated herein by reference in its entirety.

TECHNICAL FIELD

Embodiments of the disclosure generally relate to communication, and, more particularly, to methods and apparatuses for communication between a radio equipment and a radio equipment controller.

BACKGROUND

This section introduces aspects that may facilitate better understanding of the present disclosure. Accordingly, the statements of this section are to be read in this light and are not to be understood as admissions about what is in the prior art or what is not in the prior art.

Common public radio interface (CPRI) is the interface between radio equipment (RE) and radio equipment control (REC), defined in http://www.cpri.info/. As shown in the CPRI architecture of FIG. 1, CPRI carries control & management, synchronization, and user data. The term SAP refers to service access point. Each link connects two ports which have asymmetrical functions and roles: a master and a slave. According to specification 7.0, CPRI line bit rate can be selected from 10 options: 614.4 Mbps, 1228.8 Mbps, 2457.6 Mbps, 3072.0 Mbps, 4915.2 Mbps, 6144.0 Mbps, 9830.4 Mbps, 10137.6 Mbps, 12165.12 Mbps, and 24330.24 Mbps. At initial start-up procedure, REC and RE can do auto-negotiation on the bit rate.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for communication between a radio equipment and a radio equipment controller.

According to a first aspect of the disclosure, there is provided a method performed by a first transport equipment. The method may comprise detecting a bit rate of one of a radio equipment and a radio equipment controller. The one of the radio equipment and the radio equipment controller is connected with the first transport equipment through a first common public radio interface (CPRI) link. The method may further comprise locking a working bit rate of a first CPRI port of the first transport equipment to the detected bit rate. The method may further comprise generating a message indicating the detected bit rate. The method may further comprise sending the message to a second transport equipment that is connected with the other of the radio equipment and the radio equipment controller through a second CPRI link.

In this way, CPRI auto-negotiation can be supported between the radio equipment and the radio equipment controller in a case that the first and second transport equipments are deployed for CPRI transport.

In an embodiment of the disclosure, the detecting may be performed repeatedly.

In an embodiment of the disclosure, when the currently detected bit rate is different than the previously detected bit rate, the locking, generating and sending may be performed for the currently detected bit rate.

In an embodiment of the disclosure, the detecting may comprise switching the working bit rate of the first CPRI port among multiple preconfigured bit rates that can be supported by the first transport equipment. The detecting may further comprise monitoring whether CPRI frames have been successfully received from the one of the radio equipment and the radio equipment controller. The detecting may further comprise, when the successful reception of CPRI frames is monitored for one of the multiple preconfigured bit rates, determining, as the detected bit rate, the one of the multiple preconfigured bit rates.

In an embodiment of the disclosure, the locking may comprise, when the successful reception of CPRI frames is monitored for one of the multiple preconfigured bit rates, stopping the switching of the working bit rate.

In an embodiment of the disclosure, the first transport equipment may be connected with the second transport equipment through a third link whose type is the same as or different than CPRI.

In an embodiment of the disclosure, the first transport equipment may be one of: a radio over Ethernet (RoE) equipment; a flex Ethernet equipment; an optical transport network (OTN) equipment; and a wavelength division multiplexing (WDM) equipment.

In an embodiment of the disclosure, the radio equipment may be a remote radio unit (RRU) and the radio equipment controller may be a building baseband unit (BBU).

According to a second aspect of the disclosure, there is provided a method performed by a second transport equipment. The method may comprise receiving, from a first transport equipment, a message indicating a bit rate of one of a radio equipment and a radio equipment controller. The one of the radio equipment and the radio equipment controller is connected with the first transport equipment through a first (CPRI) link. The method may further comprise locking a working bit rate of a second CPRI port of the second transport equipment to the indicated bit rate. The second transport equipment is connected with the other of the radio equipment and the radio equipment controller through a second CPRI link.

In this way, CPRI auto-negotiation can be supported between the radio equipment and the radio equipment controller in a case that the first and second transport equipments are deployed for CPRI transport.

In an embodiment of the disclosure, the bit rate indicated in the message currently received may be different than the bit rate indicated in the message previously received. The working bit rate of the second CPRI port may be locked to the bit rate indicated in the message currently received.

In an embodiment of the disclosure, the method may further comprise monitoring whether CPRI frames have been successfully received from the other of the radio equipment and the radio equipment controller. The method may further comprise, when the successful reception of CPRI frames is monitored, generating another message indicating a synchronization between the radio equipment and the radio equipment controller. The method may further comprise sending the another message to the first transport equipment.

In an embodiment of the disclosure, the second transport equipment may be connected with the first transport equipment through a third link whose type is the same as or different than CPRI.

In an embodiment of the disclosure, the second transport equipment may be one of: an RoE equipment; a flex Ethernet equipment; an OTN equipment; and a WDM equipment.

In an embodiment of the disclosure, the radio equipment may be an RRU and the radio equipment controller may be a BBU.

According to a third aspect of the disclosure, there is provided a first transport equipment. The first transport equipment may comprise a detection module configured to detect a bit rate of one of a radio equipment and a radio equipment controller. The one of the radio equipment and the radio equipment controller is connected with the first transport equipment through a first CPRI link. The first transport equipment may comprise a locking module configured to lock a working bit rate of a first CPRI port of the first transport equipment to the detected bit rate. The first transport equipment may comprise a generation module configured to generate a message indicating the detected bit rate. The first transport equipment may comprise a sending module configured to send the message to a second transport equipment that is connected with the other of the radio equipment and the radio equipment controller through a second CPRI link.

In an embodiment of the disclosure, the detection module may be configured to detect the bit rate repeatedly.

In an embodiment of the disclosure, when the currently detected bit rate is different than the previously detected bit rate, the locking module, the generation module and the sending module may be triggered to operate for the currently detected bit rate.

In an embodiment of the disclosure, the detection module may comprise a switching submodule configured to switch the working bit rate of the first CPRI port among multiple preconfigured bit rates that can be supported by the first transport equipment. The detection module may further comprise a monitoring submodule configured to monitor whether CPRI frames have been successfully received from the one of the radio equipment and the radio equipment controller. The detection module may further comprise a determination submodule configured to, when the successful reception of CPRI frames is monitored for one of the multiple preconfigured bit rates, determine, as the detected bit rate, the one of the multiple preconfigured bit rates.

In an embodiment of the disclosure, the locking module may be configured to, when the successful reception of CPRI frames is monitored for one of the multiple preconfigured bit rates, stop the switching of the working bit rate.

In an embodiment of the disclosure, the first transport equipment may be connected with the second transport equipment through a third link whose type is the same as or different than CPRI.

In an embodiment of the disclosure, the first transport equipment may be one of: an RoE equipment; a flex Ethernet equipment; an OTN equipment; and a WDM equipment.

In an embodiment of the disclosure, the radio equipment may be an RRU and the radio equipment controller may be a BBU.

According to a fourth aspect of the disclosure, there is provided a second transport equipment. The second transport equipment may comprise a reception module configured to receive, from a first transport equipment, a message indicating a bit rate of one of a radio equipment and a radio equipment controller. The one of the radio equipment and the radio equipment controller is connected with the first transport equipment through a first CPRI link. The second transport equipment may comprise a locking module configured to lock a working bit rate of a second CPRI port of the second transport equipment to the indicated bit rate. The second transport equipment is connected with the other of the radio equipment and the radio equipment controller through a second CPRI link.

In an embodiment of the disclosure, the bit rate indicated in the message currently received may be different than the bit rate indicated in the message previously received. The working bit rate of the second CPRI port may be locked to the bit rate indicated in the message currently received.

In an embodiment of the disclosure, the second transport equipment may further comprise a monitoring module configured to monitor whether CPRI frames have been successfully received from the other of the radio equipment and the radio equipment controller. The second transport equipment may further comprise a generation module configured to, when the successful reception of CPRI frames is monitored, generate another message indicating a synchronization between the radio equipment and the radio equipment controller. The second transport equipment may further comprise a sending module configured to send the another message to the first transport equipment.

In an embodiment of the disclosure, the second transport equipment may be connected with the first transport equipment through a third link whose type is the same as or different than CPRI.

In an embodiment of the disclosure, the second transport equipment may be one of: an RoE equipment; a flex Ethernet equipment; an OTN equipment; and a WDM equipment.

In an embodiment of the disclosure, the radio equipment may be an RRU and the radio equipment controller may be a BBU.

According to a fifth aspect of the disclosure, there is provided a first transport equipment. The first transport equipment may comprise at least one processor and at least one memory. The at least one memory may contain instructions executable by the at least one processor, whereby the first transport equipment may be operative to detect a bit rate of one of a radio equipment and a radio equipment controller. The one of the radio equipment and the radio equipment controller is connected with the first transport equipment through a first CPRI link. The first transport equipment may be further operative to lock a working bit rate of a first CPRI port of the first transport equipment to the detected bit rate. The first transport equipment may be further operative to generate a message indicating the detected bit rate. The first transport equipment may be further operative to send the message to a second transport equipment that is connected with the other of the radio equipment and the radio equipment controller through a second CPRI link.

In an embodiment of the disclosure, the first transport equipment may be operative to perform the method according to the above first aspect.

According to a sixth aspect of the disclosure, there is provided a second transport equipment. The second transport equipment may comprise at least one processor and at least one memory. The at least one memory may contain instructions executable by the at least one processor, whereby the second transport equipment may be operative to receive, from a first transport equipment, a message indicating a bit rate of one of a radio equipment and a radio equipment controller. The one of the radio equipment and the radio equipment controller is connected with the first transport equipment through a first CPRI link. The second transport equipment may be further operative to lock a working bit rate of a second CPRI port of the second transport equipment to the indicated bit rate. The second transport equipment is connected with the other of the radio equipment and the radio equipment controller through a second CPRI link.

In an embodiment of the disclosure, the second transport equipment may be operative to perform the method according to the above second aspect.

According to a seventh aspect of the disclosure, there is provided a computer program product. The computer program product may comprise instructions which when executed by at least one processor, cause the at least one processor to perform the method according to any of the above first and second aspects.

According to an eighth aspect of the disclosure, there is provided a computer readable storage medium. The computer readable storage medium may comprise instructions which when executed by at least one processor, cause the at least one processor to perform the method according to any of the above first and second aspects.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

CPRI bit rate auto-negotiation may be done in such way that REC and RE try different bit rates in different order and interval to try to meet at a common bit rate layer 1 (L1) synchronization. REC and RE can negotiate to migrate to a new bit rate from current running bit rate. There is no problem if fiber direct connection or WDM passive mux/de-mux is used between REC and RE.

The following Table 1 shows how the master port and the slave port negotiate the bit rate. As shown, the REC tries CPRI option 7, 5, 3, 1 in decreasing order in shorter interval (e.g. 1 second). The RE tries CPRI option 1, 3, 7 in increasing order in longer interval (e.g. 3 seconds). At second 8, the two ports meet at a common bit rate of CPRI option 7, and from then on, the CPRI will work on that rate.

TABLE 1

| CPRI auto-negotiation | | | | | | | | | | | |
|---|---|---|---|---|---|---|---|---|---|---|---|
| Time Interval | 0 | 1 | 2 | 3 | 4 | 5 | 6 | 7 | 8 | 9 | 10 |
| Master port line rate option | 7 | 5 | 3 | 1 | 7 | 5 | 3 | 1 | 7 | 7 | 7 |
| Slave port line rate option | | 1 | | 3 | | | | 7 | | 7 | 7 |

Figure 1:
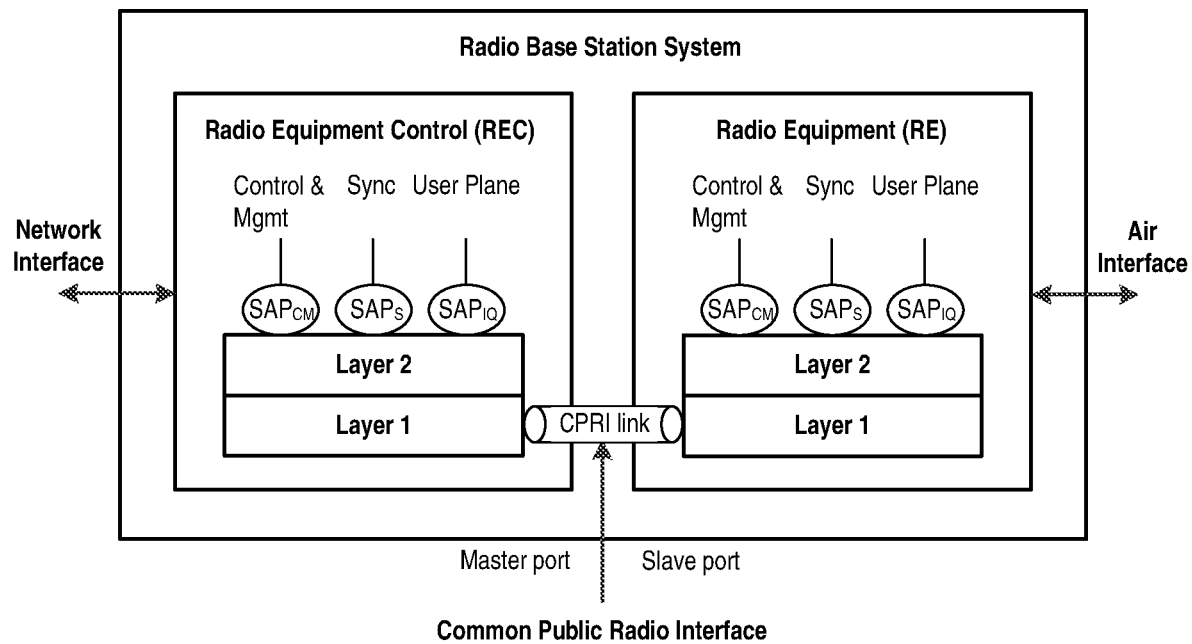
FIG. 1 is a diagram illustrating a CPRI architecture.
Figure 2:
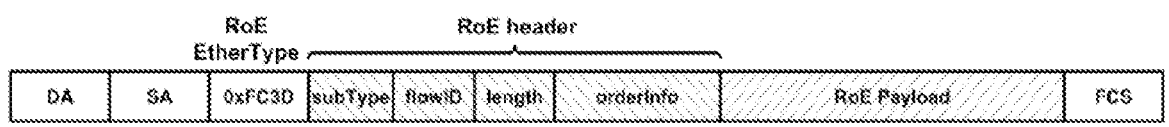
FIG. 2 is a diagram illustrating RoE encapsulation.

Radio over Ethernet (RoE) defined in institute of electrical and electronics engineers (IEEE) 1914.3 provides the encapsulation and mapping of radio protocols for transport over Ethernet frames using RoE. Three modes are defined: structure-agnostic mode for CPRI or any other radio, structure-aware mode for CPRI, and native mode for control and in-phase/quadrature (I/Q) data. FIG. 2 illustrates the encapsulation of RoE. The term DA refers to destination address and the term SA refers to source address. The term FCS refers to frame check sequence.

Figure 3:
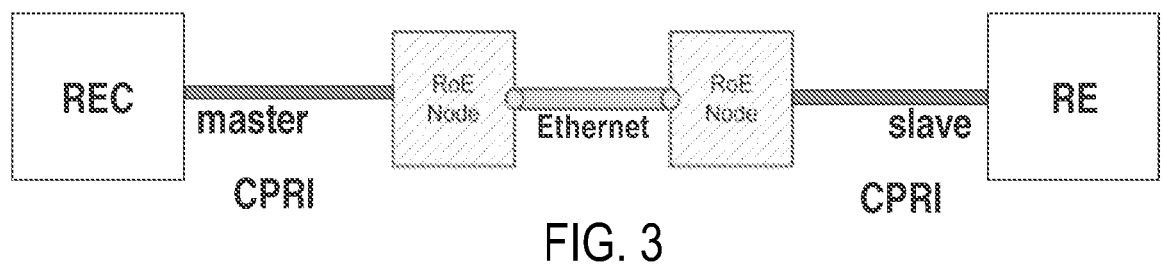
FIG. 3 is a diagram illustrating a CPRI connection with RoE nodes deployed as transport equipments in fronthaul.

As shown in FIG. 3, if RoE equipments are installed between REC and RE, the line bit rate negotiation will be interrupted. There is no definition in IEEE 1914.3 or other standards to define how to solve this problem. In this case, the system can only run at statically configured CPRI bit rate option. But statically configured CPRI bit rate cannot work for some radio access network (RAN) since CPRI auto-negotiation can be mandatory functionality in such real network.

The present disclosure provides an improved solution for communication between a radio equipment and a radio equipment controller. Hereinafter, the solution will be described in detail with reference to FIGS. 4-11.

Figure 4:
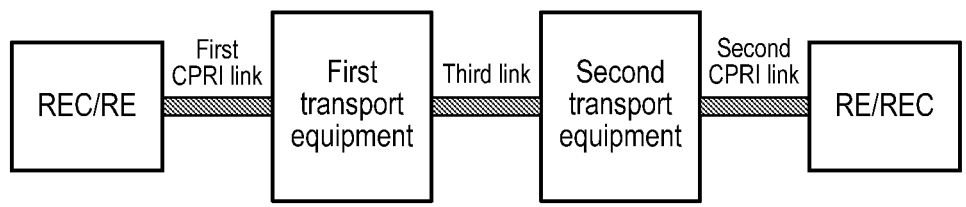
FIG. 4 is a diagram illustrating an exemplary communication system into which an embodiment of the disclosure is applicable.

FIG. 4 is a diagram illustrating an exemplary communication system into which an embodiment of the disclosure is applicable. As shown, the communication system may comprise a radio equipment (RE), a radio equipment controller, a first transport equipment and a second transport equipment. Note that for brevity of the figures, the term radio equipment controller is also simply referred to as REC. For example, the radio equipment may be a remote radio unit (RRU) and the radio equipment controller may be a building baseband unit (BBU). The first transport equipment may be any active (e.g. fronthaul) transport equipment such as an RoE equipment, a flex Ethernet equipment, an optical transport network (OTN) equipment, a wavelength division multiplexing (WDM) equipment (e.g. a WDM transponder), or the like. The second transport equipment may have the same type as the first transport equipment. Thus, examples of the second transport equipment may include, but not limited to, an RoE equipment, a flex Ethernet equipment, an OTN equipment, a WDM equipment (e.g. a WDM transponder), etc.

As shown, one of the radio equipment and the radio equipment controller is connected with the first transport equipment through a first CPRI link. The other of the radio equipment and the radio equipment controller is connected with the second transport equipment through a second CPRI link. Thus, there are two CPRI ports in the first and second transport equipments, one of which is connected to the one of the RE and the REC and the other of which is connected to the other of the RE and the REC. The first transport equipment is connected with the second transport equipment through a third link. Examples of the third link may include, but not limited to, an RoE link, a flex Ethernet link, an OTN link, a WDM link, etc. Note that the type of the third link is not necessarily different than CPRI. In other words, the principle of the present disclosure is also applicable to the scenario that the third link is a CPRI link. Also note that there may be other equipment(s) between the first and second transport equipments.

Figure 5:
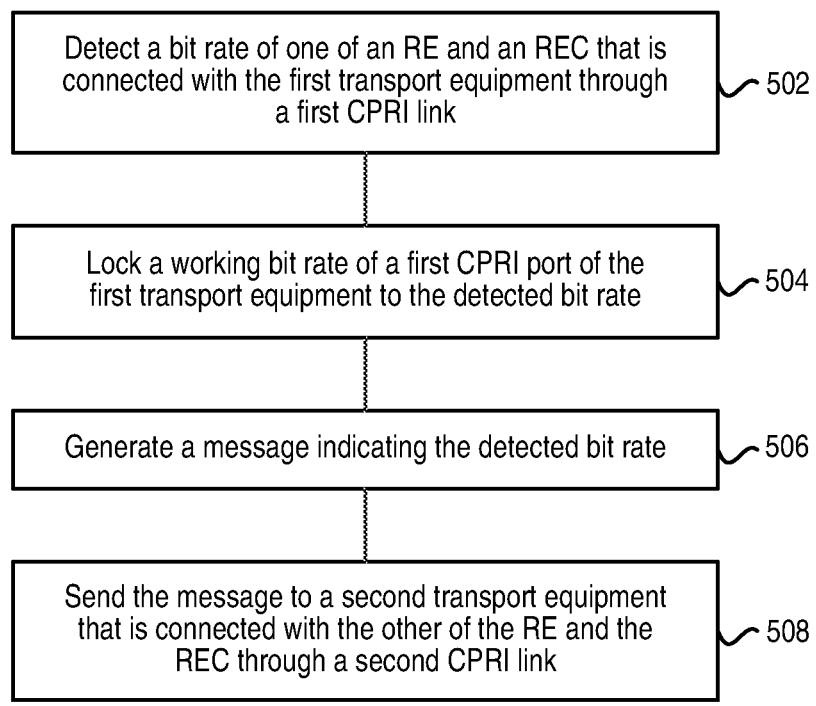
FIG. 5 is a flowchart illustrating a method implemented at a first transport equipment according to an embodiment of the disclosure.

FIG. 5 is a flowchart illustrating a method implemented at a first transport equipment according to an embodiment of the disclosure. Examples of the first transport equipment have been described above with reference to FIG. 4 and thus are omitted here. At block 502, the first transport equipment detects a bit rate of one of a radio equipment and a radio equipment controller. The one of the radio equipment and the radio equipment controller is connected with the first transport equipment through a first CPRI link.

Figure 6:
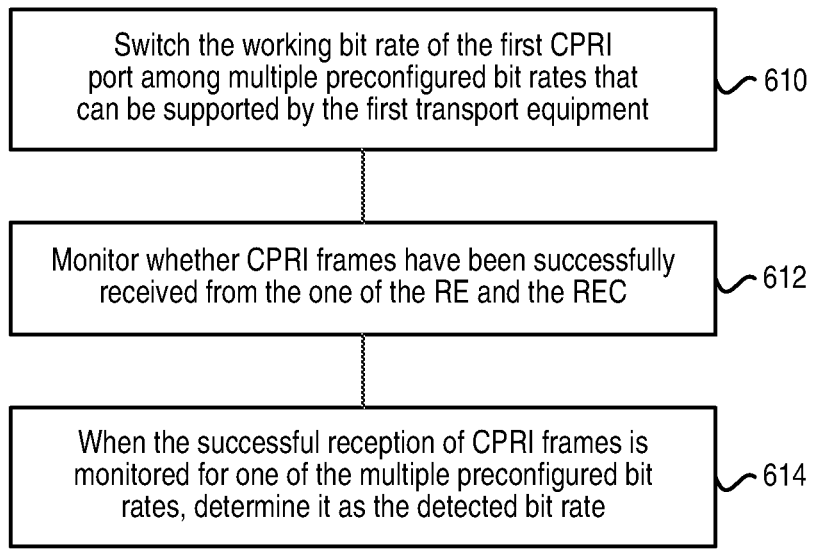
FIG. 6 is a flowchart for explaining the method of FIG. 5.

For example, block 502 may be implemented as blocks 610-614 of FIG. 6. At block 610, the first transport equipment switches the working bit rate of a first CPRI port of the first transport equipment among multiple preconfigured bit rates that can be supported by the first transport equipment. As described above, there are two CPRI ports in the first and second transport equipments. One of the two CPRI ports is the first CPRI port connected to the one of the RE and the REC. The first CPRI port may also be called transport master port. The other of the two CPRI ports is the second CPRI port in the second transport equipment which is connected to the other of the RE and the REC. The second CPRI port may also be called transport slave port. Block 610 may be done by switching the reception bit rate of the first CPRI port. The frequency of the switching may be greater than each of the frequencies at which the RE and the REC try different bit rates.

At block 612, the first transport equipment monitors whether CPRI frames have been successfully received from the one of the radio equipment and the radio equipment controller. For example, the status of the first CPRI port may be checked. If the status is DOWN, it means no CPRI frames have been successfully received. On the other hand, if the status is UP, it means CPRI frames have been successfully received. At block 614, when the successful reception of CPRI frames is monitored for one of the multiple preconfigured bit rates, the first transport equipment determines, as the detected bit rate, the one of the multiple preconfigured bit rates. Note that the detection at block 502 may also be performed in any other suitable manner.

At block 504, the first transport equipment locks a working bit rate of the first CPRI port to the detected bit rate. Since the working bit rate is locked, the first CPRI port keeps working on the locked working bit rate. For example, information (e.g. CPRI frames) may be transferred between the second transport equipment and the one of the RE and the REC. At least in the first CPRI link, the bit rate used for such transferring is the locked working bit rate. Note that the bit rate in the third link may be the same as or different than the bit rate in the first CPRI link, depending on the specific application scenarios. In the case that block 502 is implemented as blocks 610-614, the locking at block 504 may be done by stopping the switching of the working bit rate when the successful reception of CPRI frames is monitored for one of the multiple preconfigured bit rates.

At block 506, the first transport equipment generates a message indicating the detected bit rate. The detected bit rate may be indicated in various ways and the message may take any suitable form. At block 508, the first transport equipment sends the message to a second transport equipment that is connected with the other of the radio equipment and the radio equipment controller through a second CPRI link. In this way, during CPRI auto-negotiation, not only the first transport equipment can lock its working bit rate to the one of the RE and the REC, but also the second transport equipment can be allowed to achieve the same locking by means of the message indicating the detected bit rate. As a result, CPRI auto-negotiation can be supported between the RE and the REC.

The detection at block 502 may be performed repeatedly. For example, the detection may be started at any time when losing of synchronization happens. When the currently detected bit rate is different than the previously detected bit rate, the locking at block 504, the generating at block 506 and the sending at block 508 may be performed for the currently detected bit rate. In this way, the working bit rates of the first and second transport equipments can be locked to the one of the RE and the REC in real time during CPRI auto-negotiation.

Figure 7:
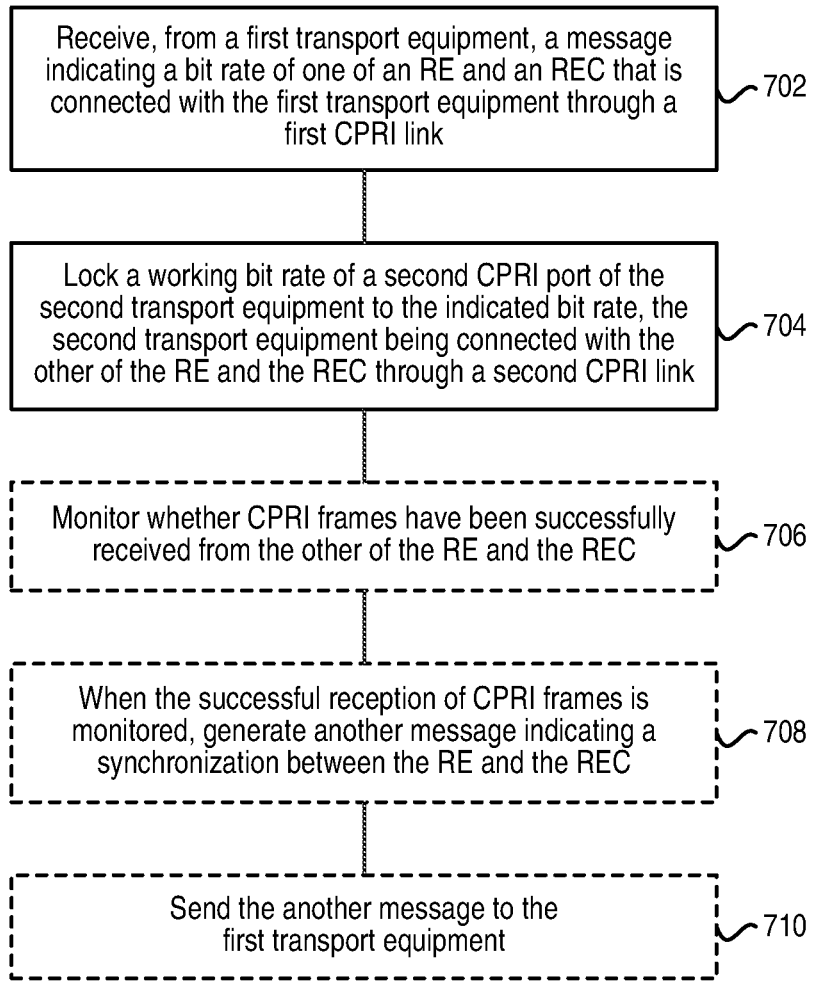
FIG. 7 is a flowchart illustrating a method implemented at a second transport equipment according to an embodiment of the disclosure.

FIG. 7 is a flowchart illustrating a method implemented at a second transport equipment according to an embodiment of the disclosure. Examples of the second transport equipment have been described above with reference to FIG. 4 and thus are omitted here. At block 702, the second transport equipment receives, from a first transport equipment, a message indicating a bit rate of one of a radio equipment and a radio equipment controller. The one of the radio equipment and the radio equipment controller is connected with the first transport equipment through a first CPRI link. At block 704, the second transport equipment locks a working bit rate of a second CPRI port of the second transport equipment to the indicated bit rate. The second transport equipment is connected with the other of the radio equipment and the radio equipment controller through a second CPRI link. Since the working bit rate is locked, the second CPRI port keeps working on the locked working bit rate. For example, information (e.g. CPRI frames) may be transferred between the first transport equipment and the other of the RE and the REC. At least in the second CPRI link, the bit rate used for such transferring is the locked working bit rate. Note that the bit rate in the third link may be the same as or different than the bit rate in the second CPRI link, depending on the specific application scenarios. With the method of FIG. 7, the second transport equipment can lock its working bit rate to the first transport equipment and the one of the RE and the REC. As a result, CPRI auto-negotiation can be supported between the RE and the REC.

As described above, each time when the first transport equipment detects a new bit rate, the new bit rate may be indicated to the second transport equipment. Thus, the bit rate indicated in the message currently received is different than the bit rate indicated in the message previously received. This may result in that the working bit rate of the second transport equipment is locked to the bit rate indicated in the message currently received.

Based on the above description, both the first and second transport equipments can lock their working bit rates to the one of the RE and the REC. Thus, during CPRI auto-negotiation, when the RE and the REC try the same bit rate in the same interval, CPRI frames from the RE can be successfully received by the REC at the same bit rate and CPRI frames from the REC can also be successfully received by the RE at the same bit rate. In this way, L1 synchronization can be achieved between the RE and the REC.

Optionally, blocks 706-710 may be performed, which may be needed when the first transport equipment needs the status to send to the connected RE/REC L1 synchronization. At block 706, the second transport equipment may monitor whether CPRI frames have been successfully received from the other of the radio equipment and the radio equipment controller. For example, the status of the second CPRI port may be checked. If the status is DOWN, it means no CPRI frames have been successfully received. On the other hand, if the status is UP, it means CPRI frames have been successfully received. At block 708, when the successful reception of CPRI frames is monitored, the second transport equipment may generate another message indicating a synchronization between the radio equipment and the radio equipment controller. The synchronization may be indicated in various ways and the another message may take any suitable form. At block 710, the second transport equipment may send the another message to the first transport equipment. It should be noted that two blocks shown in succession may, in fact, be executed substantially concurrently, or the blocks may sometimes be executed in the reverse order, depending upon the functionality involved.

To facilitate understanding of the methods described above, suppose the configuration shown in Table 1 is used for CPRI auto-negotiation between the RE and the REC. Then, the following Table 2 and Table 3 show two exemplary processes according to an embodiment of the disclosure. In these exemplary processes, the first and second transport equipments are RoE equipments. Table 2 shows the first scenario that the first transport equipment is connected with the REC, while Table 3 shows the second scenario that the first transport equipment is connected with the RE. As shown, in the first scenario, both the first and second transport equipments lock their working bit rates to that of the REC. In the second scenario, both the first and second transport equipments lock their working bit rates to that of the RE. In both scenarios, the L1 synchronization can be achieved at second 8.

TABLE 2

CPRI auto-negotiation with transport equipments between RE/REC

| Time Interval | 0 | 1 | 2 | 3 | 4 | 5 | 6 | 7 | 8 | 9 | 10 |
|---|---|---|---|---|---|---|---|---|---|---|---|
| Master port line rate option | 7 | 5 | 3 | 1 | 7 | 5 | 3 | 1 | 7 | 7 | 7 |
| RoE Master port (to REC) | 7 | 5 | 3 | 1 | 7 | 5 | 3 | 1 | 7 | 7 | 7 |
| RoE Slave port (to RE) | 7 | 5 | 3 | 1 | 7 | 5 | 3 | 1 | 7 | 7 | 7 |
| Slave port line rate option | | 1 | | | 3 | | | 7 | | 7 | 7 |

TABLE 3

CPRI auto-negotiation with transport equipments between RE/REC

| Time Interval | 0 | 1 | 2 | 3 | 4 | 5 | 6 | 7 | 8 | 9 | 10 |
|---|---|---|---|---|---|---|---|---|---|---|---|
| Master port line rate option | 7 | 5 | 3 | 1 | 7 | 5 | 3 | 1 | 7 | 7 | 7 |
| RoE Master port (to RE) | 1 | 1 | 1 | 3 | 3 | 3 | 7 | 7 | 7 | 7 | 7 |
| RoE Slave port (to REC) | 1 | 1 | 1 | 3 | 3 | 3 | 7 | 7 | 7 | 7 | 7 |
| Slave port line rate option | | 1 | | | 3 | | | 7 | | 7 | 7 |

Figure 8:
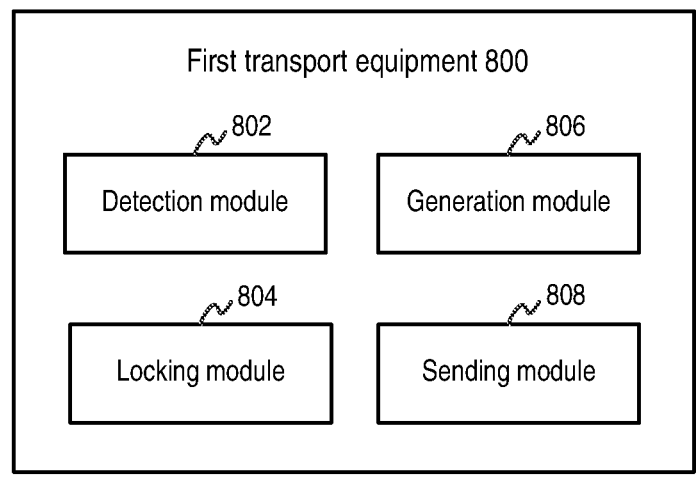
FIG. 8 is a block diagram showing a first transport equipment according to an embodiment of the disclosure.

FIG. 8 is a block diagram showing a first transport equipment according to an embodiment of the disclosure. As an example, the first transport equipment may be implemented as various integrated circuits such as digital signal processor (DSP), field programmable gate array (FPGA), or the like. As another example, the first transport equipment may also be implemented as software or a combination of hardware and software. As shown, the first transport equipment 800 comprises a detection module 802, a locking module 804, a generation module 806 and a sending module 810. The detection module 802 is configured to detect a bit rate of one of a radio equipment and a radio equipment controller. The one of the radio equipment and the radio equipment controller is connected with the first transport equipment through a first CPRI link.

Figure 9:
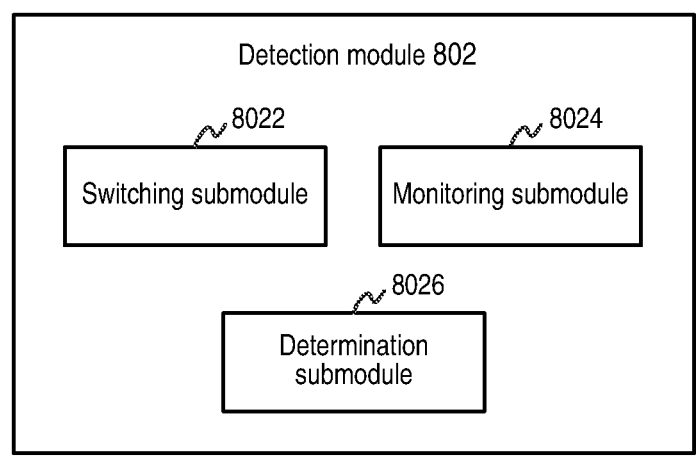
FIG. 9 is a block diagram showing a detection module of the first transport equipment according to an embodiment of the disclosure.

As an example, as shown in FIG. 9, the detection module 802 may comprise a switching submodule 8022, a monitoring submodule 8024 and a determination submodule 8026. The switching submodule 8022 may be configured to switch the working bit rate of a first CPRI port of the first transport equipment among multiple preconfigured bit rates that can be supported by the first transport equipment. The monitoring submodule 8024 may be configured to monitor whether CPRI frames have been successfully received from the one of the radio equipment and the radio equipment controller. The determination submodule 8026 may be configured to, when the successful reception of CPRI frames is monitored for one of the multiple preconfigured bit rates, determine, as the detected bit rate, the one of the multiple preconfigured bit rates.

The locking module 804 is configured to lock a working bit rate of the first CPRI port to the detected bit rate. For example, the locking module 804 may be configured to, when the successful reception of CPRI frames is monitored for one of the multiple preconfigured bit rates, stop the switching of the working bit rate. The generation module 806 is configured to generate a message indicating the detected bit rate. The sending module 808 is configured to send the message to a second transport equipment that is connected with the other of the radio equipment and the radio equipment controller through a second CPRI link.

The detection module 802 may be configured to detect the bit rate repeatedly. When the currently detected bit rate is different than the previously detected bit rate, the locking module 804, the generation module 806 and the sending module 808 may be triggered to operate for the currently detected bit rate. Note that the description about blocks 502-508 of FIG. 5 may also apply for the components 802-808 respectively. Thus, the implementation details of the components 802-808 are omitted here for brevity.

Figure 10:
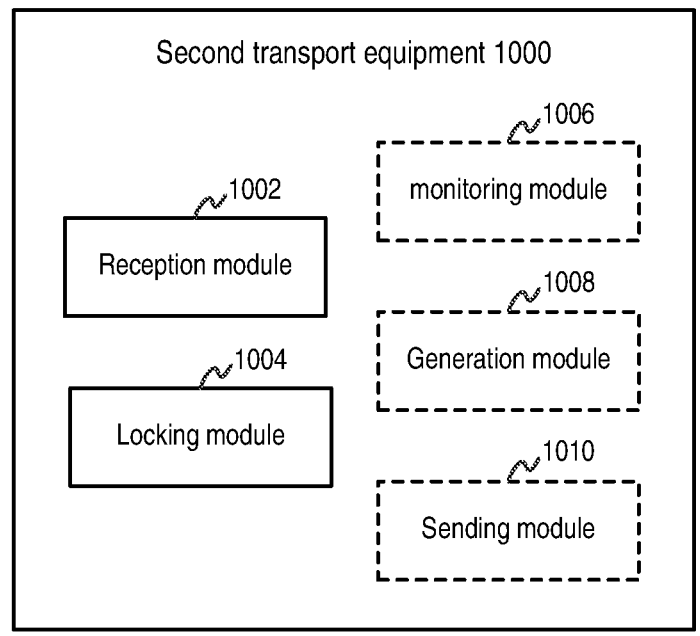
FIG. 10 is a block diagram showing a second transport equipment according to an embodiment of the disclosure.

FIG. 10 is a block diagram showing a second transport equipment according to an embodiment of the disclosure. As an example, the second transport equipment may be implemented as various integrated circuits such as digital signal processor (DSP), field programmable gate array (FPGA), or the like. As another example, the second transport equipment may also be implemented as software or a combination of hardware and software. As shown, the second transport equipment 1000 comprises a reception module 1002 and a locking module 1004. The reception module 1002 is configured to receive, from a first transport equipment, a message indicating a bit rate of one of a radio equipment and a radio equipment controller. The one of the radio equipment and the radio equipment controller is connected with the first transport equipment through a first CPRI link. The locking module 1004 is configured to lock a working bit rate of a second CPRI port of the second transport equipment to the indicated bit rate. The second transport equipment is connected with the other of the radio equipment and the radio equipment controller through a second CPRI link.

Optionally, the second transport equipment 1000 may further comprise a monitoring module 1006, a generation module 1008 and a sending module 1010. The monitoring module 1006 may be configured to monitor whether CPRI frames have been successfully received from the other of the radio equipment and the radio equipment controller. The generation module 1008 may be configured to, when the successful reception of CPRI frames is monitored, generate another message indicating a synchronization between the radio equipment and the radio equipment controller. The sending module 1010 may be configured to send the another message to the first transport equipment. Note that the description about blocks 702-710 of FIG. 7 may also apply for the components 1002-1010 respectively. Thus, the implementation details of the components 1002-1010 are omitted here for brevity.

Figure 11:
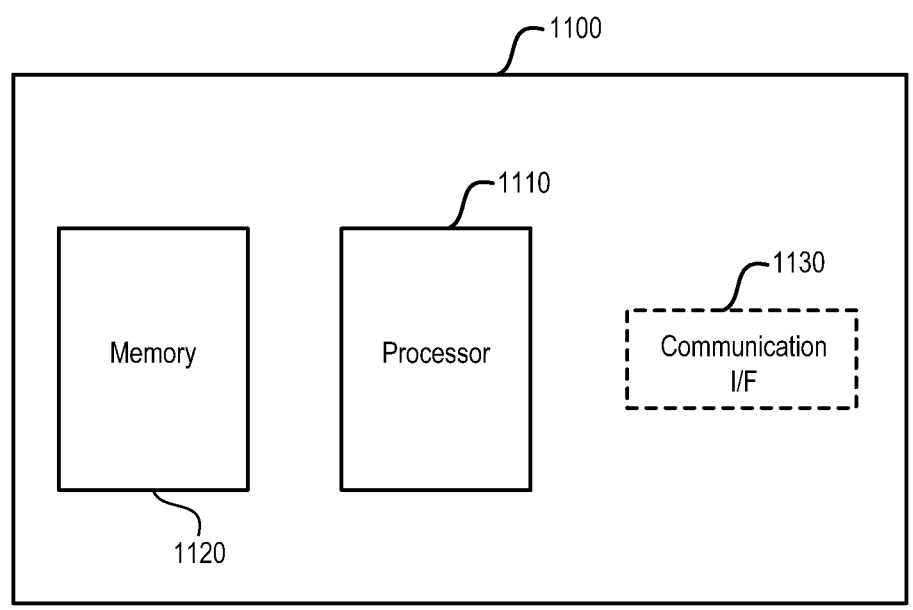
FIG. 11 is a block diagram showing an apparatus suitable for use in practicing some embodiments of the disclosure.

FIG. 11 is a block diagram showing an apparatus suitable for use in practicing some embodiments of the disclosure. For example, any one of the first and second transport equipments described above may be implemented through the apparatus 1100. As shown, the apparatus 1100 may include a processor 1110, a memory 1120 that stores a program, and optionally a communication interface 1130 for communicating data with other external devices through wired and/or wireless communication.

The program includes program instructions that, when executed by the processor 1110, enable the apparatus 1100 to operate in accordance with the embodiments of the present disclosure, as discussed above. That is, the embodiments of the present disclosure may be implemented at least in part by computer software executable by the processor 1110, or by hardware, or by a combination of software and hardware.

The memory 1120 may be of any type suitable to the local technical environment and may be implemented using any suitable data storage technology, such as semiconductor based memory devices, flash memories, magnetic memory devices and systems, optical memory devices and systems, fixed memories and removable memories. The processor 1110 may be of any type suitable to the local technical environment, and may include one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by a first transport equipment, comprising:
    detecting a bit rate of one of a radio equipment and a radio equipment controller, wherein the one of the radio equipment and the radio equipment controller is connected with the first transport equipment through a first common public radio interface, CPRI, link;
    locking a working bit rate of a first CPRI port of the first transport equipment to the detected bit rate, wherein the locking is done by stopping switching of the working bit rate when a successful reception of CPRI frames is detected after monitoring for one of multiple preconfigured rates;
    generating a message indicating the detected bit rate; and
    sending the message to a second transport equipment that is connected with the other of the radio equipment and the radio equipment controller through a second CPRI link;
    wherein the detecting comprises:
        switching the working bit rate of the first CPRI port among multiple preconfigured bit rates that can be supported by the first transport equipment;
        monitoring whether CPRI frames have been successfully received from the one of the radio equipment and the radio equipment controller; and
        when the successful reception of CPRI frames is monitored for one of the multiple preconfigured bit rates, determining, as the detected bit rate, the one of the multiple preconfigured bit rates.

2. The method according to claim 1, wherein the detecting is performed repeatedly.

3. The method according to claim 2, wherein when the currently detected bit rate is different than the previously detected bit rate, the locking, generating and sending are performed for the currently detected bit rate.

4. The method according to claim 1, wherein the first transport equipment is connected with the second transport equipment through a third link whose type is the same as or different than CPRI.

5. The method according to claim 1, wherein the first transport equipment is one of: a radio over Ethernet, RoE, equipment; a flex Ethernet equipment; an optical transport network, OTN, equipment; and a wavelength division multiplexing, WDM, equipment.

6. The method according to claim 1, wherein the radio equipment is a remote radio unit, RRU, and the radio equipment controller is a building baseband unit, BBU.

7. A method performed by a second transport equipment, comprising:
    receiving, from a first transport equipment, a message indicating a bit rate of one of a radio equipment and a radio equipment controller, wherein the one of the radio equipment and the radio equipment controller is connected with the first transport equipment through a first common public radio interface, CPRI, link;
    locking a working bit rate of a second CPRI port of the second transport equipment to the indicated bit rate, the second transport equipment being connected with the other of the radio equipment and the radio equipment controller through a second CPRI link, wherein the locking is done by stopping switching of the working bit rate when a successful reception of CPRI frames is detected after monitoring for one of multiple preconfigured rates;
    monitoring whether CPRI frames have been successfully received from the other of the radio equipment and the radio equipment controller;
    when the successful reception of CPRI frames is monitored, generating another message indicating a synchronization between the radio equipment and the radio equipment controller; and
    sending the another message to the first transport equipment.

8. The method according to claim 7, wherein the bit rate indicated in the message currently received is different than the bit rate indicated in the message previously received; and
    wherein the working bit rate of the second CPRI port is locked to the bit rate indicated in the message currently received.

9. The method according to claim 7, wherein the second transport equipment is connected with the first transport equipment through a third link whose type is the same as or different than CPRI.

10. The method according to claim 7, wherein the second transport equipment is one of: a radio over Ethernet, RoE, equipment; a flex Ethernet equipment; an optical transport network, OTN, equipment; and a wavelength division multiplexing, WDM, equipment.

11. The method according to claim 7, wherein the radio equipment is a remote radio unit, RRU, and the radio equipment controller is a building baseband unit, BBU.

12. A first transport equipment comprising:
    at least one processor; and
    at least one memory, the at least one memory containing instructions executable by the at least one processor, whereby the first transport equipment is operative to:
        detect a bit rate of one of a radio equipment and a radio equipment controller, wherein the one of the radio equipment and the radio equipment controller is connected with the first transport equipment through a first common public radio interface, CPRI, link;
        lock a working bit rate of a first CPRI port of the first transport equipment to the detected bit rate, wherein the locking is done by stopping switching of the working bit rate when a successful reception of CPRI frames is detected after monitoring for one of multiple preconfigured rates;
        generate a message indicating the detected bit rate; and
        send the message to a second transport equipment that is connected with the other of the radio equipment and the radio equipment controller through a second CPRI link; and
    wherein the detect the bit rate comprises:
        switch the working bit rate of the first CPRI port among multiple preconfigured bit rates that can be supported by the first transport equipment;

monitor whether CPRI frames have been successfully received from the one of the radio equipment and the radio equipment controller; and when the successful reception of CPRI frames is monitored for one of the multiple preconfigured bit rates, determine, as the detected bit rate, the one of the multiple preconfigured bit rates.

13. A second transport equipment comprising:

at least one processor; and at least one memory, the at least one memory containing instructions executable by the at least one processor, whereby the second transport equipment is operative to:

receive, from a first transport equipment, a message indicating a bit rate of one of a radio equipment and a radio equipment controller, wherein the one of the radio equipment and the radio equipment controller is connected with the first transport equipment through a first common public radio interface, CPRI, link;

lock a working bit rate of a second CPRI port of the second transport equipment to the indicated bit rate, the second transport equipment being connected with the other of the radio equipment and the radio equipment controller through a second CPRI link, wherein the locking is done by stopping switching of the working bit rate when a successful reception of CPRI frames is detected after monitoring for one of multiple preconfigured rates;

monitor whether CPRI frames have been successfully received from the other of the radio equipment and the radio equipment controller;

when the successful reception of CPRI frames is monitored, generate another message indicating a synchronization between the radio equipment and the radio equipment controller; and send the another message to the first transport equipment.

* * * * *